United States Patent
Leone et al.

(10) Patent No.: US 11,473,920 B2
(45) Date of Patent: *Oct. 18, 2022

(54) ENHANCED VEHICLE REFUELING

(71) Applicant: Ford Global Technologies, LLC, Dearborn, MI (US)

(72) Inventors: Thomas G. Leone, Ypsilanti, MI (US); Kenneth James Miller, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/639,683

(22) PCT Filed: Aug. 24, 2017

(86) PCT No.: PCT/US2017/048512
§ 371 (c)(1),
(2) Date: Feb. 17, 2020

(87) PCT Pub. No.: WO2019/040074
PCT Pub. Date: Feb. 28, 2019

(65) Prior Publication Data
US 2020/0264001 A1 Aug. 20, 2020

(51) Int. Cl.
*G01C 21/36* (2006.01)
*B60K 28/10* (2006.01)
(Continued)

(52) U.S. Cl.
CPC ..... *G01C 21/3469* (2013.01); *B60W 50/0097* (2013.01); *B60W 60/001* (2020.02); *F17C 13/026* (2013.01); *F17C 13/028* (2013.01); *G01C 21/34* (2013.01); *G01C 21/3492* (2013.01); *B60W 2555/20* (2020.02); *Y02T 10/84* (2013.01)

(58) Field of Classification Search
CPC ............... G01C 21/3492; G01C 21/36; G01N 33/0075; F02D 41/0087; B60K 28/10; B67D 7/0401
See application file for complete search history.

(56) References Cited

U.S. PATENT DOCUMENTS 6,651,706 B2   11/2003   Litt
6,691,025 B2   2/2004    Reimer
(Continued)

FOREIGN PATENT DOCUMENTS

| CN | 102042102 A | * | 5/2011 | ......... F02D 41/0087 |
| JP | 2002123524 A |   | 4/2002 | |
| WO | 2011051949 A1 |   | 5/2011 | |

OTHER PUBLICATIONS

International Search Report of the International Searching Authority for PCT/US2017/048512 dated Nov. 20, 2017.
(Continued)

*Primary Examiner* — Yuri Kan
(74) *Attorney, Agent, or Firm* — Brandon Hicks; Bejin Bieneman PLC

(57) ABSTRACT

Data are collected on at least one of a coolant temperature of a vehicle, an atmospheric ozone level, and air quality. A refueling time is determined based on the collected data. The vehicle is moved to a fueling station based on the refueling time.

20 Claims, 3 Drawing Sheets

(51) Int. Cl.
    *G01C 21/34*     (2006.01)
    *B60W 50/00*     (2006.01)
    *B60W 60/00*     (2020.01)
    *F17C 13/02*     (2006.01)

(56) References Cited

U.S. PATENT DOCUMENTS

| | | |
|---|---|---|
| 7,103,460 B1 | 9/2006 | Breed |
| 7,302,968 B2 | 12/2007 | Stuart |
| 7,421,321 B2 | 9/2008 | Breed et al. |
| 7,938,150 B2 | 5/2011 | Handa |
| 8,116,972 B2 | 2/2012 | Klampfl et al. |
| 8,738,277 B1 | 5/2014 | Kurosawa et al. |
| 8,849,555 B2 | 9/2014 | Scofield et al. |
| 8,880,270 B1 | 11/2014 | Ferguson et al. |
| 9,349,224 B2 | 5/2016 | Tahnoose et al. |
| 9,400,500 B2 | 7/2016 | Delp |
| 2002/0159061 A1 | 10/2002 | Ottens et al. |
| 2006/0185756 A1 | 8/2006 | Sato et al. |
| 2008/0024323 A1* | 1/2008 | Kadaba ............. G01N 33/0075 340/905 |
| 2008/0214069 A1 | 9/2008 | Kawanishi et al. |
| 2009/0005974 A1 | 1/2009 | Lenneman et al. |
| 2009/0157289 A1 | 6/2009 | Graessley |
| 2009/0204316 A1 | 8/2009 | Klampfl et al. |
| 2010/0023162 A1 | 1/2010 | Gresak et al. |
| 2011/0093305 A1 | 4/2011 | Alexander et al. |
| 2011/0137470 A1 | 6/2011 | Surnilla et al. |
| 2011/0202221 A1 | 8/2011 | Sobue et al. |
| 2012/0179353 A1 | 7/2012 | Anilovich et al. |
| 2012/0261437 A1 | 10/2012 | Sabo et al. |
| 2013/0220006 A1 | 8/2013 | Ito et al. |
| 2014/0202584 A1 | 7/2014 | Mathison |
| 2014/0251495 A1 | 9/2014 | Harty et al. |
| 2015/0106001 A1* | 4/2015 | Lee ..................... G01C 21/36 701/123 |
| 2015/0316406 A1 | 11/2015 | Gale et al. |
| 2016/0033293 A1 | 2/2016 | Nobrega |
| 2016/0091338 A1 | 3/2016 | Abuelsaad et al. |
| 2016/0139600 A1 | 5/2016 | Delp |
| 2017/0051652 A1 | 2/2017 | De Smet et al. |
| 2017/0210391 A1* | 7/2017 | Dudar .................... B60K 28/10 |
| 2017/0217753 A1 | 8/2017 | Dudar |
| 2017/0316635 A1 | 11/2017 | Guo et al. |
| 2020/0255281 A1* | 8/2020 | Leone ................. B67D 7/0401 |

OTHER PUBLICATIONS

Non-Final Office Action for related U.S. Appl. No. 16/639,837 as issued by the USPTO dated Dec. 8, 2021.

Sundar, K., et al., "Algorithms for Routing an Unmanned Aerial Vehicle in the Presence of Refueling Depots," IEEE Transactions on Automation Science and Engineering, Jan. 2014, Retrieved from the Internet URL: http://arxiv.org/ftp/arxiv/papers/1304/1304.0494.pdf, vol. 11(1), pp. 1-9.

International Search Report of the International Searching Authority for PCT/US2017/048513 dated Nov. 14, 2017.

Final Office Action as issued for U.S. Appl. No. 16/639,837 as issued by the USPTO dated Jun. 20, 2022.

\* cited by examiner

ENHANCED VEHICLE REFUELING

BACKGROUND

Vehicles require fuel to operate. It may be determined to refuel a vehicle when a fuel gauge indicator is below a certain level. The vehicle can then be navigated to a fueling station to refuel the vehicle. However, opportunities to refuel a vehicle may be constrained to certain times of day and/or to specified fueling stations, e.g., at specified locations. Various environmental conditions can affect what times and/or places are possible and/or better than other times and/or places for refueling. Unfortunately, current vehicles are lacking the ability to receive and process data to determine a time and location to refuel the vehicle.

DETAILED DESCRIPTION

Figure 1:
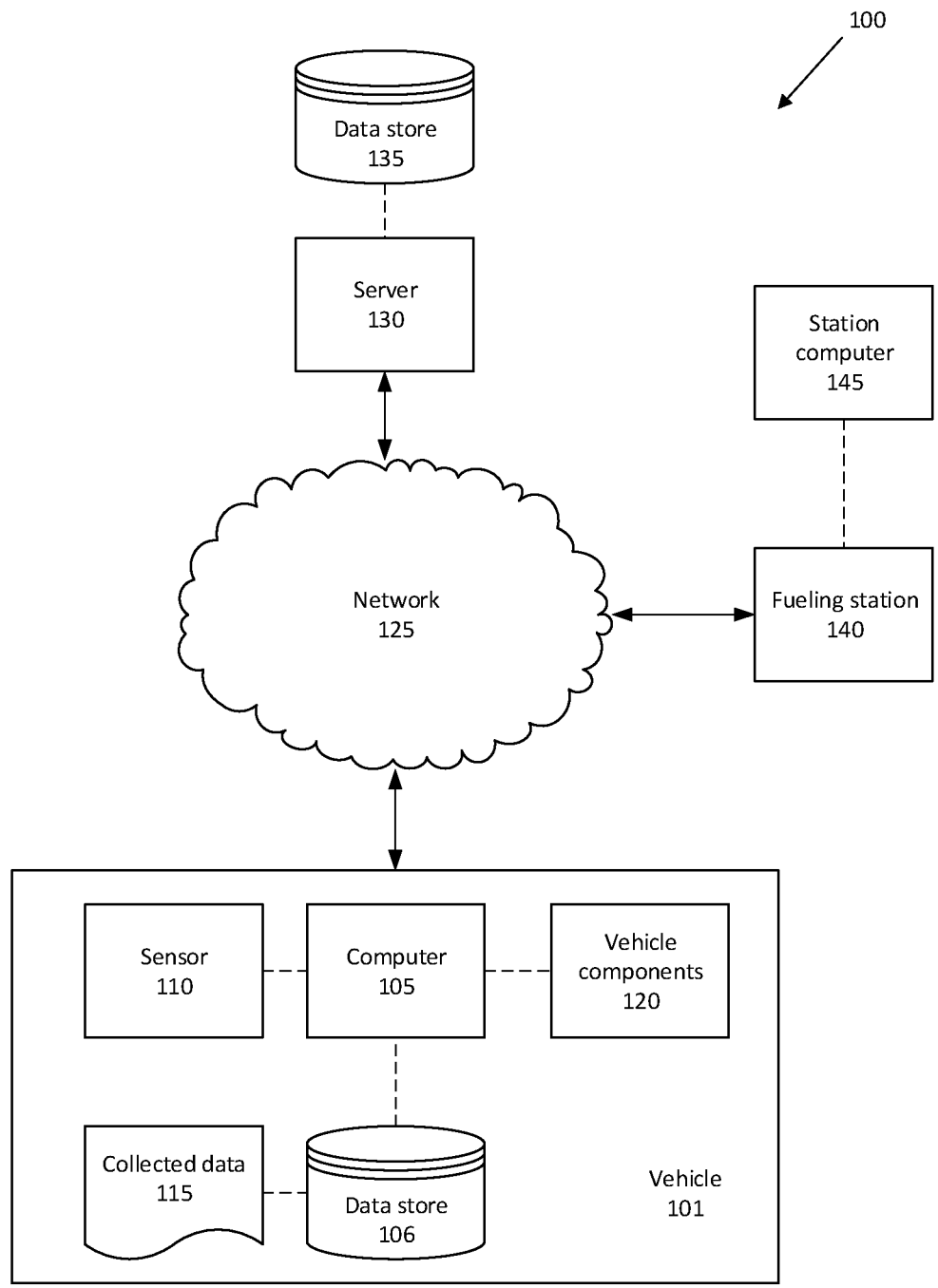
FIG. 1 is a block diagram of an example system for refueling a vehicle.

A system includes a computer programmed to collect data on at least one of a coolant temperature of a vehicle, an atmospheric ozone level, and air quality, determine a refueling time based on the collected data, and move the vehicle to a fueling station based on the refueling time.

The computer can be further programmed to collect data on a time of use of the vehicle and to determine the refueling time based on the time of use.

The computer can be further programmed to determine the refueling time based on a weighted sum of a plurality of factors based on the collected data. The computer can be further programmed to weight the factors based on user input. The computer can be further programmed to weight the factors based on user operation of the vehicle.

The user operation can include data on a time of a previous instance of use of the vehicle, and the factors can include a factor based on the time of the previous instance of use of the vehicle.

The computer can be further programmed to identify a fuel station from a stored list and to determine the refueling time based on a location of the identified fuel station.

The computer can be further programmed to determine that a current day is an ozone alert day and to determine the refueling time after a predicted sunset time on the ozone alert day.

The computer can be further programmed to collect data on all of the coolant temperature of a vehicle, the atmospheric ozone level, and the air quality, and to determine the refueling time based on the collected data.

The computer can be further programmed to collect data on a traffic congestion level of a roadway and to determine the refueling time based on the traffic congestion level.

A method includes collecting data on at least one of a coolant temperature of a vehicle, an atmospheric ozone level, and air quality, determining a refueling time based on the collected data, and moving the vehicle to a fueling station based on the refueling time.

The method can further include collecting data on a time of use of the vehicle and to determine the refueling time based on the time of use.

The method can further include determining the refueling time based on a weighted sum of a plurality of factors based on the collected data. The method can further include weighting the factors based on user input. The method can further include weighting the factors based on user operation of the vehicle.

In the method, the user operation can include data on a time of a previous instance of use of the vehicle, and the factors can include a factor based on the time of the previous instance of use of the vehicle.

The method can further include identifying a fuel station from a stored list and to determine the refueling time based on a location of the identified fuel station.

The method can further include determining that a current day is an ozone alert day and determining the refueling time after a predicted sunset time on the ozone alert day.

The method can further include collecting data on all of the coolant temperature of a vehicle, the atmospheric ozone level, and the air quality, and determining the refueling time based on the collected data.

The method can further include collecting data on a traffic congestion level of a roadway and determining the refueling time based on the traffic congestion level.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A vehicle computer can determine a time and a location to refuel a vehicle based on data collected from sensors and a server. The computer can collect data on, e.g., environmental conditions, vehicle parameters, a vehicle location, etc., and determine a time to refuel the vehicle and a location at which to refuel the vehicle. The computer can determine a refueling score based on environmental and vehicle data to provide more predictable refueling opportunities and to more consistently maintain fuel in the vehicle. The computer can determine a location score based on environmental and vehicle data to provide more convenient locations to refuel the vehicle. By processing a plurality of factors based on various environmental and vehicle data, the computer can reduce the constraints that can limit refueling opportunities.

FIG. 1 illustrates an example system 100 for refueling a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system can include a fueling station 140. The fueling station 140 stores fuel that can be provided to vehicles 101. The fuel can be a known energy source for the vehicle 101, e.g., gasoline, diesel, compressed natural gas, ethanol, butanol, biodiesel, jet fuel, electricity at an electric charging station, etc. The fueling station 140 can include a station computer 145. The station computer 145 can communicate with the network 125. The station computer 145 can collect data 115 about the fueling station 140 and send the data 115 over the network 125 to the server 130 and/or the computer 105. The station computer 145 can be, e.g., a dedicated station console, a personal computer, a laptop, a tablet, a smartphone, etc.

The computer 105 can determine a plurality of factors based on data 115 collected by the sensors 110 and/or from the server 130. The factors can represent one or more elements that can affect when the vehicle 101 can refuel and where the vehicle 101 can refuel. The computer 105 can determine a refueling score and a location score based on the factors. Each factor can be a value between 0 and 1 based on the collected data 115, as shown in the Equations 1-15 below.

The refueling score can be a value used by the computer 105 to determine when to refuel the vehicle 101. For example, the computer 105 can determine the refueling score as a function of time, and determine a time at which the refueling score will fall below a refueling score threshold. Upon reaching a time within a time threshold of the refueling time, the computer 105 can determine to refuel the vehicle 101. Alternatively or additionally, if the computer 105 determines that the current refueling score is below the threshold, the computer 105 can determine to refuel the vehicle 101. The refueling score can be a combination of the factors, e.g., a weighted sum of a plurality of the factors. For example, the computer 105 can collect data 115 on at least one of a coolant temperature of a vehicle, an atmospheric ozone level, and air quality and determine a refueling time based on the collected data 115. The refueling score can be a weighted sum of the factors:

$$S_{refuel} = \sum_{i=1}^{n} k_i f_i \qquad (1)$$

where $S_{refuel}$ is the refueling score, i is an index indicating one of the plurality of factors, n is the total number of factors used to determine the refueling score, $f_i$ is the value of one of the factors, and $k_i$ is a predetermined weighting for the factor $f_i$. One or more of the factors $f_i$ can change with time, e.g., the vehicle fuel tank factor can change as fuel is consumed by the vehicle 101. The computer 105 can predict, using known regression techniques, one or more of the time-dependent factors for a future time period, e.g., 24 hours. The computer 105 can thus predict the refueling score $S_{refuel}$ for the time period based on the time-dependent factors.

The location score can be a value used by the computer 105 to determine a location at which to refuel the vehicle 101. Upon determining to refuel the vehicle 101, the computer 105 can determine the location score for a plurality of fueling stations 140. The fueling stations 140 can be determined from a stored list in the data store 106 and/or the server 130. The computer 105 can select the fueling station 140 with the highest location score and can then move the vehicle 101 to the selected fueling station 140 to refuel the vehicle 101. The location score can be a combination of factors, e.g., a weighted sum of a plurality of the factors, as described below. For example, the computer 105 can collect data 115 on a turbidity of fuel in an underground fuel storage tank at each of a plurality of fueling stations 140, select a fueling station 140 based on the collected data, 115 and move the vehicle 101 to the selected fueling station 140. The location score can be a weighted sum of the factors:

$$S_{location} = \sum_{i=1}^{n} k_i f_i \qquad (2)$$

where $S_{locatin}$ is the location score, i is an index indicating one of the plurality of factors, n is the total number of factors used to determine the location score, $f_i$ is the value of one of the factors, and $k_i$ is a predetermined weighting for the factor $f_i$.

The computer 105 can determine a vehicle fuel tank factor based on data 115 collected from a fuel tank of the vehicle 101. The computer 105 can collect data 115 about a fuel level in the vehicle fuel tank from a vehicle fuel tank sensor 110. The vehicle fuel tank factor can be inversely related to the fuel level data 115, i.e., as the vehicle fuel level decreases, the vehicle fuel tank factor increases. The vehicle fuel tank factor can be inversely proportional to the vehicle fuel level data 115 in a linear manner, or the vehicle fuel tank factor can be related to the vehicle fuel level data 115 in a nonlinear manner (e.g., polynomial, exponential, factorial, etc.). Equation 3 below describes an example sigmoid function describing the vehicle fuel tank factor $f_{vft}$.

$$f_{vft} = \frac{1}{1 + \exp(CV - D)} \qquad (3)$$

where C and D are predetermined constants to fit the factor between 0 and 1, V is a vehicle fuel level (i.e., a number between 0 and 1 indicating a fraction of the fuel tank volume filled with fuel), and exp is the known exponential function. As the vehicle fuel level V decreases toward 0 (i.e., an empty fuel tank), the refueling score $S_{refuel}$ increases as the vehicle fuel tank factor $f_{vft}$ exponentially approaches 1.

The vehicle fuel tank factor can be weighted such that the weighted sum exceeds the refueling score threshold when the vehicle fuel level data 115 falls below a vehicle fuel level threshold. That is, the computer 105 can determine the refueling time to be a time that is no later than a predicted time when the vehicle fuel level will fall below the vehicle fuel level threshold. For example, as shown in the example Equation 4, $$k_{vft} \cdot f_{vft}(V_{threshold}) \geq S_{refuel,threshold} \qquad (4)$$

where $k_{vft}$ is the weighting value for the vehicle fuel tank factor, $V_{threshold}$ is the vehicle fuel level threshold, and $S_{refuel,threshold}$ is the refueling score threshold.

The computer 105 can determine a vehicle-not-in-use factor. The computer 105 can, using known techniques, determine confidence values for a plurality of times of day indicating an instance of use of the vehicle 101. The confidence value can be a probability that the vehicle 101 will be in use at the specific time of day. The computer 105 can determine the confidence values based on, e.g., historical data 115 of use of the vehicle 101. The computer 105 can determine the vehicle-not-in-use factor based on confidence values that indicate that the vehicle 101 will not be in use at a specific time of day. The vehicle-not-in-use factor can increase for times of day when the vehicle 101 is predicted not to be in use, i.e., the computer 105 can prefer a refueling time when the vehicle 101 is not in use. Furthermore, the computer 105 can determine a time of a previous instance of use of the vehicle 101, and the vehicle-not-in-use factor can be based on the time of the previous instance of use of the vehicle 101. For example, the vehicle-not-in-use factor $f_{niu}$ can be determined with a normal distribution function, the example Equation 5:

$$f_{niu} = \exp\left(-\frac{(t - t_{niu})^2}{C}\right) \qquad (5)$$

where t is a current time in hours between 0 and 24, $t_{niu}$ is a predicted time when the vehicle 101 is predicted not to be in use (e.g., outside of a work shift for a service vehicle 101, outside of a user's commuting schedule, etc.), and C is a constant value that can be determined based on how close to $t_{niu}$ the vehicle-not-in-use factor should increase.

The computer 105 can determine a non-peak-use factor. The computer 105 can determine times of day when roadways can be congested. The computer 105 can request traffic data 115 from the server 130 and, using probability calculations such as a Hidden Markov Model, determine times of day that indicate peak use of the roadways. The computer 105 can collect data 115 on a traffic congestion level of the roadway and determine the non-peak-use factor based on the traffic congestion level. The non-peak-use factor can increase for times of day that are not peak use of the roadways, and can decrease for times of day that indicate peak use of the roadways. For example, the non-peak-use factor can be 0 when the time of day is a peak use time of day (as determined from the probability calculations) and 1 when the time of day is a non-peak-use time of day. For example, the non-peak-use factor $f_{npu}$ can be determined with a sigmoid function such as the example Equation 6:

$$f_{npu} = C \operatorname{arccot}(a \cdot p(t) - b) \qquad (6)$$

where a, b, C are predetermined constants determined to bound the non-peak-use factor between 0 and 1 and p(t) is a probability of traffic congestion for a specific time t.

The computer 105 can determine a fuel price factor. The computer 105 can collect data 115 from the server 130 indicating prices of fuel at a plurality of fuel stations 140. The computer 105 can use known techniques, e.g., machine learning, historical trends, etc., to predict a fuel price. The fuel price factor can increase as data 115 indicating fuel prices decrease. For example, the computer 105 can determine a difference between a current fuel price $p_1$ at one of the fuel stations 140 and predicted fuel price $p_{pred}$ and determine the fuel price factor as:

$$f_{price} = C \exp\left(\frac{p_{pred} - p_1}{p_1}\right) \qquad (7)$$

where C is a predetermined constant.

The computer 105 can determine a weather factor. The computer can receive data 115 from e.g., the server 130, a precipitation sensor 110, a wind speed sensor 110, a temperature sensor 110, etc. The weather factor can increase when the precipitation data 115 increases, the wind speed data 115 increases, and the temperature data 115 is either above a heat threshold or below a cold threshold. For example, the weather factor $f_{weather}$ can be a sum of the data 115:

$$f_{weather} = \frac{precip_0}{precip_{avg}} + \frac{v_o}{v_{avg}} + T_{HI} + T_{LO} \qquad (8)$$

where $precip_0$ is a current precipitation percentage, $precip_{avg}$ is an average precipitation percentage for a current day, $v_0$ is a current wind speed, $v_{avg}$ is an average wind speed for a current day, $T_{HI}$ is a Boolean value that is 0 when a current ambient temperature is below the heat threshold and 1 when the current ambient temperature is above the heat threshold, and $T_{LO}$ is a Boolean value that is 0 when the current ambient temperature is above the cold threshold and 1 when the current ambient temperature is below the cold threshold.

The computer 105 can determine a station preference factor. The computer 105 can determine a plurality of preferred fuel stations 140, e.g., a corporate fueling station 140 approved by a fleet operator, specified by a user of the vehicle 101, fueling stations 140 near a route traveled by the vehicle 101, etc. The station preference factor can increase based when a distance between the vehicle 101 and one of the preferred stations 140 decreases. For example, the station preference factor $f_{sp}$ can be determined based on the example Equation 9:

$$f_{sp} = C \exp(-ax) \qquad (9)$$

where a, C are predetermined constants and x is a current distance between the location of the vehicle 101 and a closest preferred fueling station 140.

The computer 105 can determine a warm-up factor. The computer 105 can determine an engine coolant temperature from a sensor 110. As the engine coolant warms, a powertrain consumes less fuel, so the vehicle 101 can consume less fuel when moving to the fueling station 140 when the engine coolant temperature is above a coolant temperature threshold. The warm-up factor can increase when the engine coolant temperature increases. For example, the warm-up factor $f_{warm}$ can be determined based on the example Equation 10:

$$f_{warm} = C \operatorname{arcsinh}(a \cdot T_{coolant}) \qquad (10)$$

where a, C are predetermined constants, arcsinh is the inverse hyperbolic sine function, as is known, and $T_{coolant}$ is a current coolant temperature.

The computer 105 can determine an ozone alert factor. The computer 105 can receive data 115 from the server 130 indicating whether a current day is an ozone alert day, i.e., a day when local authorities encourage users to refuel vehicles 101 after dark to reduce ozone and smog generation. The computer 105 can determine the refueling time after a predicted sunset time on the ozone alert day. The ozone alert factor can decrease during time between a predicted sunrise time and the predicted sunset time when the data 115 from the server 130 indicates that the current day is an ozone alert day. For example, the ozone alert factor can be a Boolean value that is 0 when the current day is an ozone alert day and the current time is between the predicted sunrise time and the predicted sunset time on the ozone alert day and is 1 when the current time is between the predicted sunset time of the current day and the predicted sunrise time of the following day.

The computer 105 can determine an air quality factor. The air quality factor can be based on data 115 indicating a level of dust and debris that can interfere with refueling. The computer 105 can collect data 115 of a wind speed and a humidity to determine the air quality factor. The air quality factor can decrease for increasing wind speed and can decrease for decreasing humidity. For example, the air quality factor $f_{air}$ can be determined based on the example Equation 11:

$$f_{air} = C \exp\left(a \cdot \frac{\phi}{v}\right) \qquad (11)$$

where a, C are predetermined constants, $\phi$ is the relative humidity, and v is a wind speed.

The computer 105 can determine a distance factor. The distance factor can be based on data 115 indicating a distance between a planned predetermined route of the vehicle 101 and each fueling station 140. The distance factor can decrease as the distance increases. For example, the distance factor $f_{distance}$ can be inversely proportional to a distance $x_{station}$ between the geo-location coordinates of the vehicle 101 and the geo-location coordinates of the fueling station 140, for example, as shown in the example Equation 12:

$$f_{distance} = \frac{C}{x_{station}} \qquad (12)$$

where C is a predetermined constant.

The computer 105 can determine a facilities factor. The facilities factor can be based on data 115 indicating facilities, i.e., points of interest and/or amenities, available at the fueling station 140. Example facilities include, e.g., restaurants, coffee shops, scenic views, walking paths, pet areas, access to WiFi, etc. The facilities factor can increase for facilities that are predetermined as preferred by the user based on, e.g., historical data, user input, etc. The computer 105 can determine a number of facilities $n_f$ at a fueling station 140 and determine the facilities factor $f_{facilities}$ according to the example Equation 13:

$$f_{facilities} = \frac{1}{1 + \exp(-n_f)} \qquad (13)$$

The computer 105 can determine an ease-of-access factor. The ease-of-access factor can be based on data 115 indicating features increasing access to the fueling station 140 based on the route of the vehicle 101. The features can include, e.g., whether the fueling station 140 is along the direction of travel of the vehicle 101 on the route, a number of fuel pumps available at the fueling station 140, etc. The ease-of-access factor can increase as the number of features increases. The computer 105 can identify the number of features $N_{features}$ and determine the ease-of-access factor $f_{eac}$ according to the example Equation 14:

$$f_{eac} = \frac{1}{1 + \exp(-N_{features})} \quad (13)$$

The computer 105 can determine a turbidity factor of fuel at the fuel station 140. The fuel station 140 can include a plurality of underground fuel storage tanks that store the liquid fuel. The fuel storage tanks can be refilled by trucks carrying fuel. When the trucks refill the fuel storage tanks, the turbidity of the fuel in the fuel storage tanks can increase as sediment in the fuel storage tanks is stirred up. The sediment can be collected by a fuel filter in the vehicle 101, reducing the life of the fuel filter. The computer 105 can collect data 115 from the server 130 indicating a refill time when the underground fuel storage tanks were most recently refilled. As the refill time increases, the sediment in the underground fuel storage tanks can settle. The turbidity factor can decrease for increasing refill time. Furthermore, the computer 105 can collect data 115 on an estimated fuel level of the fuel storage tank at each of the plurality of fueling stations 140. A lower estimated fuel level can increase the turbidity factor as the amount of sediment increases relative to the volume of remaining fuel. The computer 105 can further determine a time elapsed since replacement of a fuel filter of the vehicle 101 and determine the turbidity factor based on the time elapsed. For example, the turbidity factor $f_{turbidity}$ based on the refill time $t_{fill}$ and the estimated fuel level of the fuel storage tank $V_{storage}$ according to the example Equation 14:

$$f_{turbiidity} = \left(\frac{1}{t_{fill}}\right)\left(\frac{1}{V_{storage}}\right) \quad (14)$$

The computer 105 can determine a congestion factor. The congestion factor can be based on data 115 indicating an occupancy of vehicles 101 at the fueling station 140 and a number of available fuel pumps at the fueling station 140. The computer 105 can collect data 115 from the server 130 indicating the occupancy of vehicles 101 and the number of available fuel pumps at each fueling station 140. The congestion factor can increase for an increasing number of vehicles 101 and a decreasing number of available fuel pumps. The computer 105 can determine a number of vehicles $n_{veh}$ and a number of available fuel pumps $n_{pump}$ and determine the congestion factor $f_{cong}$ based on the example Equation 15:

$$f_{cong} = \frac{n_{veh}}{n_{pump}} \quad (15)$$

The refueling score and the location score can each be determined based on a weighted sum of the factors. The computer 105 can assign a weighting value to each factor to control the influence of the specific factor on the respective score. For example, the computer 105 can assign a higher weighting value to the fuel gauge factor than to the vehicle-not-in-use factor for the refueling score, indicating that the fuel gauge factor can influence the refueling score more than the vehicle-not-in-use factor. Each weighting value can be a predetermined value stored in the data store 106 and/or the server 130. Alternatively or additionally, the computer 105 can determine each weighting value based on user input and/or user operation of the vehicle 101.

For example, initial weighting values can be determined to focus on customer convenience, e.g., higher weighting values for vehicle fuel tank factor and vehicle-not-in-use factor than other factors. Users can adjust the weighting values based on personal preferences, e.g., a user can select a higher weighting value on fuel price factor, preferring to spend less money on fuel. Vehicles 101 that can require refueling times longer than a few minutes (e.g. electric vehicles) can have a higher weighting value for facilities factor to occupy the user during refueling. In an area which implements penalties for daytime refueling on ozone action days, the user can select a higher weighting value on ozone alert factor. If warranty data shows clogged fuel filters for certain vehicles 101 or in certain geographic areas, the server 130 can send an increased weighting value for turbidity factor for those vehicles 101. The weighting value can be a constant value or can be a nonconstant function, e.g., a linear function, a polynomial function, an exponential function, etc., based on the value of the specific factor and/or the data 115 used to determine the factor.

Figure 2:
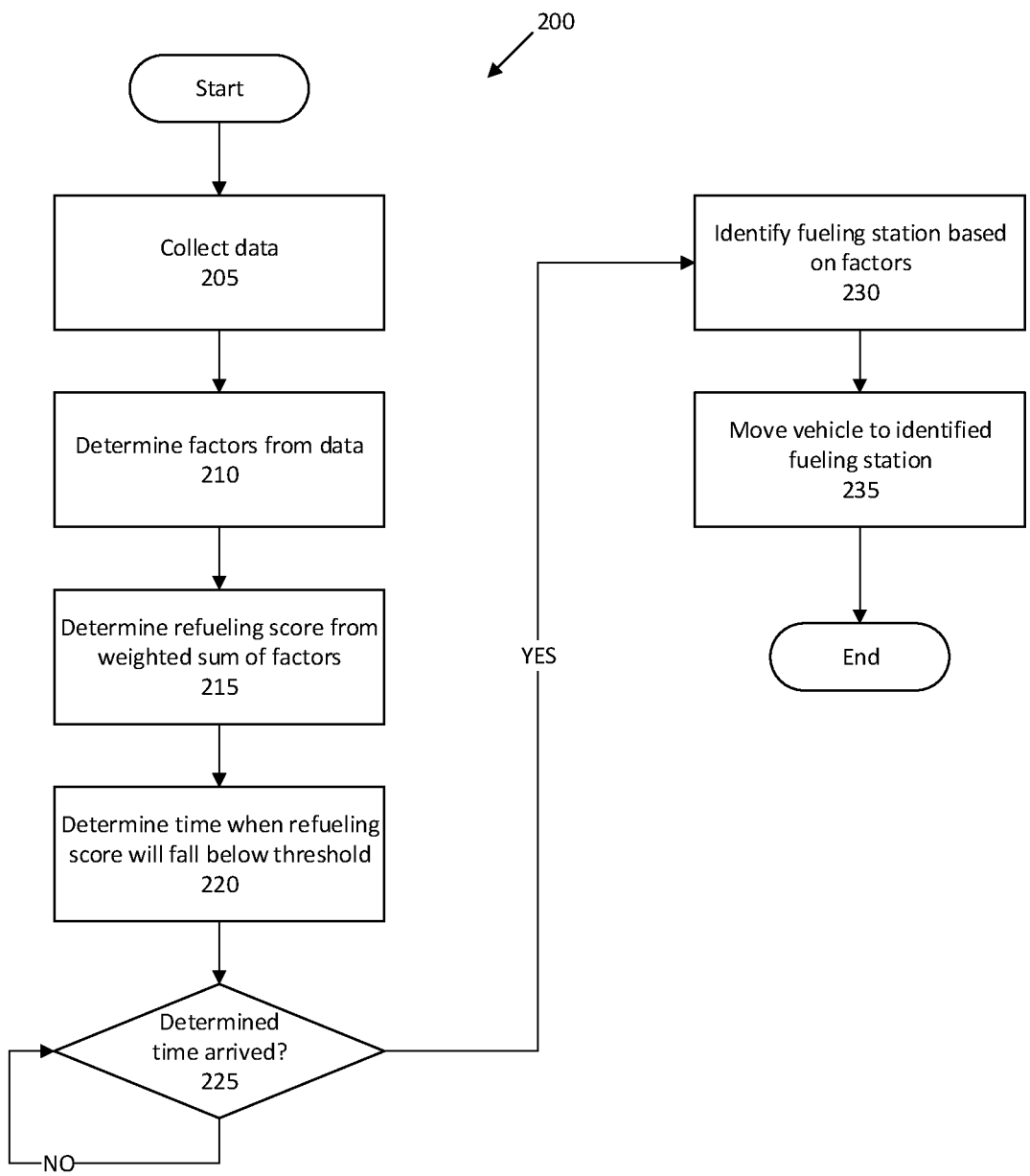
FIG. 2 illustrates an example process for determining a refueling time for the vehicle.

FIG. 2 illustrates an example process 200 for determining a refueling time for the vehicle 101. The process 200 begins in a block 205, in which the computer 105 actuates one or more sensors 110 to collect data 115. The computer 105 can actuate the sensors 110 to collect data 115 on, e.g., a vehicle 101 position, a vehicle 101 trajectory, a fuel gauge level, an atmospheric ozone level, weather, etc.

Next, in a block 210, the computer 105 determines factors based on the data 115. As described above, the computer 105 can determine a plurality of factors based on the collected data 115. For example, the computer 105 can determine an ozone alert factor based on the collected data 115 about the atmospheric ozone. In another example, the computer 105 can determine a vehicle fuel tank factor based on a vehicle fuel tank level. Example factors based on the data 115 are shown in equations 1-15 above.

Next, in a block 215, the computer 105 determines a refueling score based on a weighted sum of the factors. As described above, the refueling score indicates whether the vehicle 101 is to be refueled. When the refueling score falls below a refueling score threshold, the computer 105 can move the vehicle 101 to refuel. The weighting of each of the factors can be a predetermined value or nonconstant function stored in the server 130 and/or the data store 106. Alternatively or additionally, the weighting of each of the factors can be determined based on, e.g., user input, user operation of the vehicle 101, etc. For example, the weighting for one of the factors can initially be a predetermined constant value stored in the server 130, and the computer 105 can prompt the user to provide input to optionally change the value of the weighting. In another example, the weighting for one of the factors can be an exponential function of the data 115 used for the factor, and the computer 105 can be programmed not to prompt user input to change the weighting.

Next, in a block 220, the computer 105 determines a refueling time. The refueling time is the predicted time at which the refueling score will fall below the refueling score threshold. As described above, the computer 105 can predict the refueling score for a future period of time based on one or more time-dependent factors and determine a time at which the refueling score will fall below the refueling score threshold. Thus, at the refueling time, the computer 105 can move the vehicle 101 to a fueling station 140 to refuel.

Next, in a block 225, the computer 105 determines whether the refueling time has arrived. The computer 105 can determine that the refueling time has arrived when a current time is within a time threshold of the refueling time. The time threshold can be a predetermined value, e.g., 10 minutes, and stored in the server 130 and/or the data store 106. If the refueling time has arrived, the process 200 continues in a block 230. Otherwise, the computer 105 remains in the block 225 until the refueling time has arrived.

In the block 230, the computer 105 identifies a fueling station 140 based on the factors. As described above and shown in a process 300 below, the computer 105 can determine a location score for each of a plurality of fueling stations 140. The computer 105 can identify a refueling station 140 based on the fueling scores.

Next, in a block 235, the computer 105 moves the vehicle 101 to the fueling station 140 identified in the block 230. The computer 105 can actuate a steering 120, a propulsion 120, and a brake 120 to move the vehicle 101 to the fueling station 140 to refuel. Following the block 235, the process 200 ends.

Figure 3:
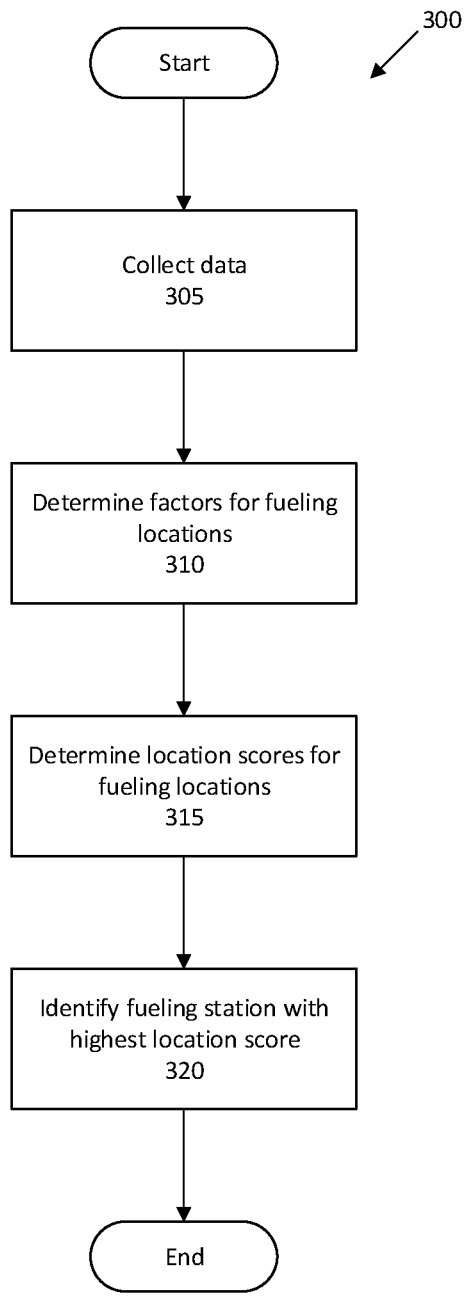
FIG. 3 illustrates an example process for determining a fueling station for the vehicle.

FIG. 3 illustrates an example process 300 for determining a fueling station 140 at which to refuel the vehicle 101. The process 300 begins in a block 305, in which the computer 105 actuates one or more sensors 110 to collect data 115. As described above, the computer 105 can collect data 115 about the vehicle 101 and/or a plurality of fueling stations 140. The computer 105 can collect data 115 from each station computer 145 at each fueling station 140.

Next, in a block 310, the computer 105 determines a plurality of factors for each fueling station 140. Each factor, as described above, can be based on data 115 collected by the computer 105 from the server 130 and/or sensors 110. For example, the computer 105 can determine a distance factor that is inversely proportional to a determined distance between the fueling station 140 and the vehicle 101 based on geo-location data 115.

Next, in a block 315, the computer 105 determines a location score for each fueling station 140. The computer 105 can determine the location score as a weighted sum of the factors described above. The weighting for each factor can be a predetermined value stored in the server 130 and/or the data store 106. Alternatively or additionally, the computer 105 can adjust the weighting for one or more of the factors based on, e.g., user input, vehicle 101 driving history, etc.

Next, in a block 320, the computer 105 identifies the fueling station 140 with the highest location score. Upon identifying the fueling station 140, the computer 105 can move the vehicle 101 to the identified fueling station 140, as described above in the block 235 of the process 200. Following the block 320, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computing device 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
collect data on at least one of a coolant temperature of a vehicle, an atmospheric ozone level, and air quality;
determine a refueling time based on the collected data; and
move the vehicle to a fueling station based on the refueling time.

2. The system of claim 1, wherein the computer is further programmed to collect data on a time of use of the vehicle and to determine the refueling time based on the time of use.

3. The system of claim 1, wherein the computer is further programmed to determine the refueling time based on a weighted sum of a plurality of factors based on the collected data.

4. The system of claim 3, wherein the computer is further programmed to weight the factors based on user input.

5. The system of claim 3, wherein the computer is further programmed to weight the factors based on user operation of the vehicle.

6. The system of claim 5, wherein the user operation includes data on a time of a previous instance of use of the vehicle, and the factors include a factor based on the time of the previous instance of use of the vehicle.

7. The system of claim 1, wherein the computer is further programmed to identify a fuel station from a stored list and to determine the refueling time based on a location of the identified fuel station.

8. The system of claim 1, wherein the computer is further programmed to determine that a current day is an ozone alert day and to determine the refueling time after a predicted sunset time on the ozone alert day.

9. The system of claim 1, wherein the computer is further programmed to collect data on all of the coolant temperature of a the vehicle, the atmospheric ozone level, and the air quality, and to determine the refueling time based on the collected data.

10. The system of claim 1, wherein the computer is further programmed to collect data on a traffic congestion level of a roadway and to determine the refueling time based on the traffic congestion level.

11. A method, comprising:
collecting data on at least one of a coolant temperature of a vehicle, an atmospheric ozone level, and air quality;
determining a refueling time based on the collected data; and
moving the vehicle to a fueling station based on the refueling time.

12. The method of claim 11, further comprising collecting data on a time of use of the vehicle and to determine the refueling time based on the time of use.

13. The method of claim 11, further comprising determining the refueling time based on a weighted sum of a plurality of factors based on the collected data.

14. The method of claim 13, further comprising weighting the factors based on user input.

15. The method of claim 13, further comprising weighting the factors based on user operation of the vehicle.

16. The method of claim 15, wherein the user operation includes data on a time of a previous instance of use of the vehicle, and the factors include a factor based on the time of the previous instance of use of the vehicle.

17. The method of claim 11, further comprising identifying a fuel station from a stored list and to determine the refueling time based on a location of the identified fuel station.

18. The method of claim 11, further comprising determining that a current day is an ozone alert day and determining the refueling time after a predicted sunset time on the ozone alert day.

19. The method of claim 11, further comprising collecting data on all of the coolant temperature of the vehicle, the atmospheric ozone level, and the air quality, and determining the refueling time based on the collected data.

20. The method of claim 11, further comprising collecting data on a traffic congestion level of a roadway and determining the refueling time based on the traffic congestion level.

* * * * *